US010607482B2

(12) United States Patent
Farajpour et al.

(10) Patent No.: US 10,607,482 B2
(45) Date of Patent: Mar. 31, 2020

(54) INTELLIGENT DISTRIBUTED VISION TRAFFIC MARKER AND METHOD THEREOF

(71) Applicant: Robert Bosch GmbH, Stuttgart (DE)

(72) Inventors: Pouya Farajpour, Menlo Park, CA (US); Pedram Lajevardi, Menlo Park, CA (US); Sam Kavusi, Menlo Park, CA (US); Johan Vanderhaegen, Sunnyvale, CA (US)

(73) Assignee: Robert Bosch GmbH, Stuttgart, DE (US)

( * ) Notice: Subject to any disclaimer, the term of this patent is extended or adjusted under 35 U.S.C. 154(b) by 0 days.

(21) Appl. No.: 16/062,554

(22) PCT Filed: Dec. 30, 2016

(86) PCT No.: PCT/EP2016/082914
§ 371 (c)(1),
(2) Date: Jun. 14, 2018

(87) PCT Pub. No.: WO2017/114947
PCT Pub. Date: Jul. 6, 2017

(65) Prior Publication Data
US 2018/0357895 A1    Dec. 13, 2018

Related U.S. Application Data

(60) Provisional application No. 62/273,637, filed on Dec. 31, 2015.

(51) Int. Cl.
*G08G 1/02* (2006.01)
*G08G 1/01* (2006.01)
(Continued)

(52) U.S. Cl.
CPC ............ *G08G 1/02* (2013.01); *E01F 9/30* (2016.02); *E01F 9/553* (2016.02); *G08G 1/0116* (2013.01);
(Continued)

(58) Field of Classification Search
None
See application file for complete search history.

(56) References Cited

U.S. PATENT DOCUMENTS 6,466,862 B1 * 10/2002 DeKock .............. G08G 1/0104
340/901
7,297,916 B1 * 11/2007 Feng ................. H01L 27/14627
250/208.1
(Continued)

FOREIGN PATENT DOCUMENTS

EP        1 149 371        8/2000
JP      2008-299580 A      12/2008
(Continued)

OTHER PUBLICATIONS

International Search Report corresponding to PCT Application No. PCT/EP2016/082914, dated Mar. 31, 2017 (4 pages).
(Continued)

*Primary Examiner* — Chico A Foxx
(74) *Attorney, Agent, or Firm* — Maginot, Moore & Beck LLP

(57) ABSTRACT

A vision traffic marker network system comprises a plurality of vision traffic markers or traffic nodes configured to capture information such as an event, an environment, a profile, or a condition of an object such as vehicle, human, combination thereof, or the like, for example. The environment information may be time of day, day of week, weather, traffic condition, and the like. The nodes may be one of a traffic node, an ambient node, a repeater, a gateway, or a
(Continued)

combination thereof. These nodes are arranged in network neighborhoods and configured to communicate with at least one of the communication networks with at least one of the vision traffic markers or nodes, a control system, the automotive, a server, a global navigation system, other non-vision devices, traffic lights, street lights, electronic devices, or combination thereof, via one more links, either wirelessly or wired communication. The vision traffic marker network system analysis, process, distribute, and report the information to any vision traffic marker network system, client machines, and a server over a network.

8 Claims, 13 Drawing Sheets

(51) Int. Cl.
   G08G 1/054 (2006.01)
   E01F 9/553 (2016.01)
   E01F 9/30 (2016.01)
   H04W 84/18 (2009.01)
   G08G 1/017 (2006.01)
(52) U.S. Cl.
   CPC ......... *G08G 1/0133* (2013.01); *G08G 1/0175* (2013.01); *G08G 1/054* (2013.01); *H04W 84/18* (2013.01)

(56) References Cited

U.S. PATENT DOCUMENTS

| | | | | |
|---|---|---|---|---|
| 9,024,787 B2* | 5/2015 | Alshinnawi | ...... | G08G 1/096783 340/928 |
| 9,118,825 B2* | 8/2015 | Singh | ...... | G02B 7/021 |
| 9,615,066 B1* | 4/2017 | Tran | ...... | H04N 7/183 |
| 2006/0227011 A1 | 10/2006 | Fripp, II et al. | | |
| 2006/0261458 A1* | 11/2006 | Paek | ...... | H01L 25/167 257/680 |
| 2010/0254282 A1 | 10/2010 | Chan et al. | | |
| 2012/0033123 A1 | 2/2012 | Inoue et al. | | |
| 2012/0156714 A1* | 6/2012 | O'Brien | ...... | G01J 3/2803 435/29 |
| 2012/0249341 A1* | 10/2012 | Brown | ...... | G08G 1/0104 340/902 |
| 2013/0275032 A1 | 10/2013 | Yorke et al. | | |
| 2014/0118257 A1* | 5/2014 | Baldwin | ...... | G06F 3/017 345/158 |
| 2014/0211012 A1* | 7/2014 | Nerayoff | ...... | G06K 9/00771 348/148 |
| 2015/0356871 A1* | 12/2015 | Kugel | ...... | G01C 21/3697 340/935 |
| 2018/0096595 A1* | 4/2018 | Janzen | ...... | G06K 9/00785 |

FOREIGN PATENT DOCUMENTS

JP  2009-251876 A  10/2009
JP  2012-038089 A  2/2012

OTHER PUBLICATIONS

English Translation of Notification of Reasons for Refusal corresponding to Japanese Patent Application No. 2018-534572, dispatched Sep. 30, 2019 (8 pages).

* cited by examiner

INTELLIGENT DISTRIBUTED VISION TRAFFIC MARKER AND METHOD THEREOF

CROSS-REFERENCE TO RELATED APPLICATION

This application is a 35 U.S.C. § 371 National Stage Application of PCT/EP2016/082914, filed on Dec. 30, 2016, which claims priority to a U.S. provisional patent application Ser. No. 62/273,637, filed Dec. 31, 2015, the contents of both applications are incorporated herein by reference as if fully enclosed herein.

FIELD

This disclosure relates generally to traffic markers and, more particularly, to an intelligent distributed vision traffic marker.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to an intelligent distributed vision traffic marker system comprises a sensor assembly comprising a camera and a sensing element, one of the camera or the sensing element configured to obtain information of at least one of an event, a condition, a vehicle profile, a human profile and a processor for carrying or having computer-executable instructions to direct information to a different vision traffic marker system operated in a mesh network, wherein the information further including existing and predictive information of at least one of next event or next condition. In one embodiment, the processor controls the different vision traffic marker system based on the information. For example, the vision traffic marker systems may be integrated into road/traffic signs, advertisement boards, street signs, signboard markers, location markers, mile markers, and automotive vehicles. The information may be further redirected, forwarded, rerouted, shared, or broadcasted to one or more of vision traffic marker systems operated in the mesh network. The sensing element is selected from a group consisting of a thermal sensor, a humidity sensor, an inertial sensor, a gas sensor, a motion sensor, a profile sensor, an environmental sensor, an optical sensor, or an acoustic sensor.

According to another exemplary embodiment of the disclosure, a device comprises a non-transitory computer-readable medium for carrying or having computer-executable instructions to obtain information of at least one of an event, a condition, a vehicle profile, a human profile, the instructions causing a machine to direct information to a vision traffic marker system operated in a mesh network, wherein the information further includes existing and predictive information of at least one of next event or next condition. The device further comprises the instructions causing a machine to controls the vision traffic marker system based on the information. The information may be redirected, forwarded, rerouted, shared, or broadcasted to a different vision traffic marker system operated in the mesh network.

According to another exemplary embodiment of the disclosure, an intelligent distributed vision traffic marker assembly comprises a first vision traffic marker system to obtain information associated with an event or a condition and a processor for carrying or having computer-executable instructions to direct information to a second vision traffic marker system operated in a mesh network, wherein the information further including existing and predictive information of at least one of next event or next condition. The processor for example integrated into an external device may further controls the at least one of the first or second vision traffic marker system. The information may be redirected, forwarded, rerouted, shared, or broadcasted to one or more of vision traffic marker systems operated in the mesh network different from first or second vision traffic marker.

According to another exemplary embodiment of the disclosure, a vision traffic marker includes a sensor assembly, a processing assembly, an energy source, and a communication interface assembly housed in a casing. The vision traffic marker is communicatively coupled to any vision traffic markers, client machines, server over a network. The vision traffic marker is a cloud-based computing device and may be deployed at any location to perform one or more tasks that operate either individually or in concert as multiple sub-group networks.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
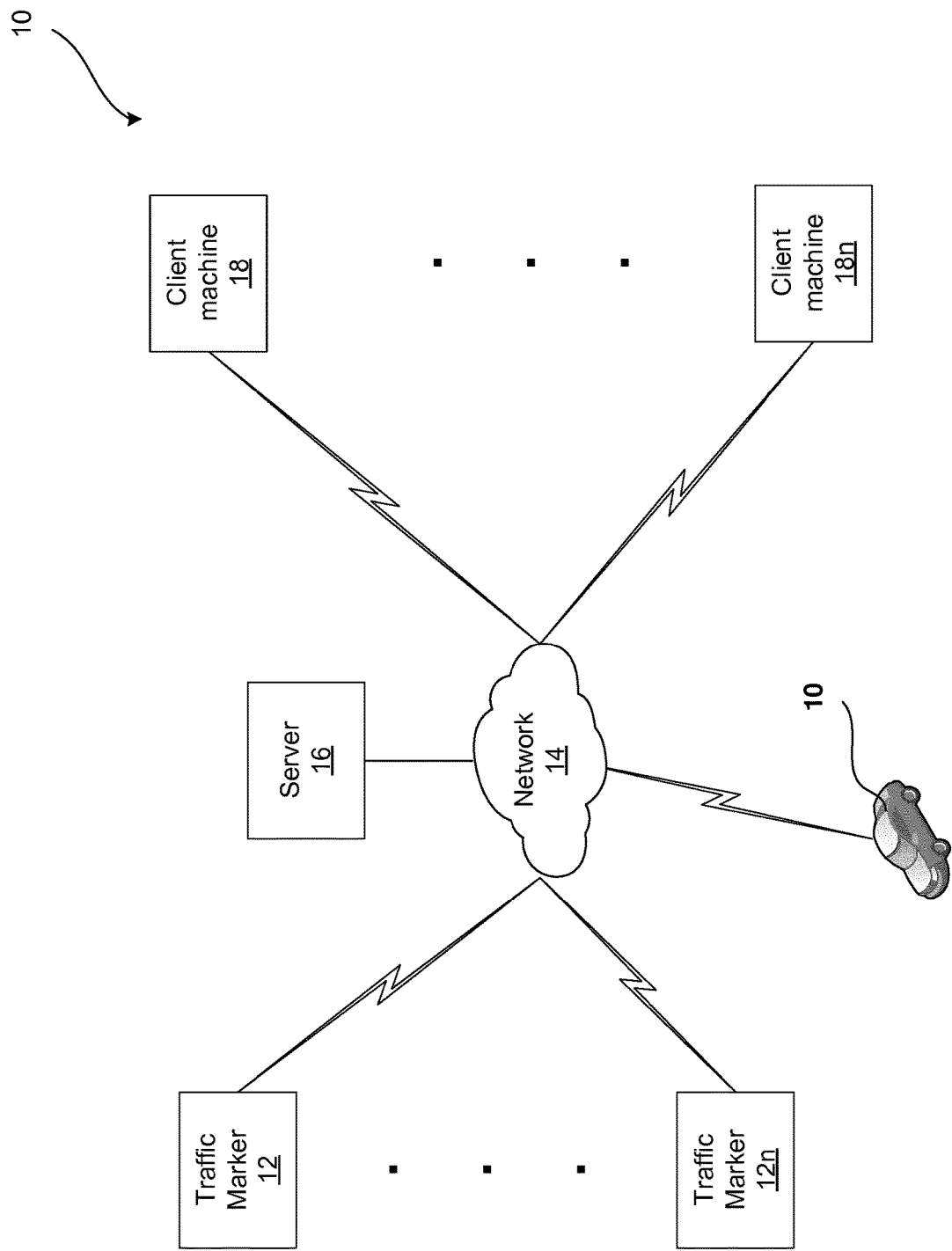
FIG. 1 is a perspective view illustrating a traffic environment network system according to an exemplary embodiment of the disclosure.

FIG. 1 illustrates a traffic environment network system 10 of an exemplary embodiment of a disclosure. The system network 10 includes a network 14 communicatively coupled to a plurality of traffic markers 12 and at least one client device 18 via communication links in a distributed computing environment. The traffic markers 12 are configured to detect an event, an environment, and a status of a target. The target includes traffic condition, weather condition, and any condition related to the environment. The traffic markers 12 are also configured to collect, analyze, distribute, and report detected information to a stakeholder. The client machines 18 may be a personal computer or desktop computer, a laptop, a cellular or smart phone, a tablet, a personal digital assistant (PDA), a gaming console, an audio device, a video device, a vehicle infotainment, a wearable device, an entertainment device such as a television, or the like. A server 16 may be optionally integrated into the network 14. In some embodiments, one or more servers may be communicatively coupled to the client devices 18 the traffic markers 12, and the network 14. The server 16 may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like. The client machine 18 can in some embodiment be referred to as a single client machine or a single group of client machines, while the server 16 may be referred to as a single server or a single group of servers. In one embodiment a single client machine communicates with more than one server, while in another embodiment a single server communicates with more than one client machine. In yet another embodiment, a single client machine communicates with a single server. The client machines 18 can link to the traffic markers 12 through a number of ways which may be for example by voice input, typing, gesture input, biometric input, and the like.

The network 14 can comprise one or more sub-networks, and can be installed between any combination of the client machines 16, the server 16, and the traffic markers 12. In some embodiments, the network 14 can be for example a local-area network (LAN), a metropolitan area network (MAN), a wide area network (WAN), a primary network comprised of multiple sub-networks located between the client machines 18, the server 16, and the traffic markers 12, a primary public network with a private sub-network, a primary private network with a public sub-network, or a primary private network with a private sub-network. Still further embodiments include the network 14 that can be any network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data exchanged between the client machine and the server can be transmitted over the network. Network topology of the network 14 can differ within different embodiments which may include a. bus network topology, a star network topology, a ring network topology, a repeater-based network topology, or a tiered-star network topology. Additional embodiments may include a network of mobile telephone networks that use a protocol to communicate among mobile devices, where the protocol can be for example AMPS, TDMA, CDMA, GSM, GPRS, UMTS, LTE or any other protocol able to transmit data among mobile devices. In some embodiments, the traffic marker 12 is a cloud computing device which may be communicated with via the Internet, and which may be co-located or geographically distributed, wherein shared resources, software, and information are provided to computers and other devices on demand for example, as will be appreciated by those skilled in the art. V In another embodiment, the cloud based traffic markers 12 may be implemented as one or more servers which may be communicated with via the Internet.

The communication interfaces between the client machines 18, the traffic markers 12, the network 14, and the server 16 may be wired, wireless, or combination thereof. The wireless communication interfaces may include cellular protocol, data packet protocol, radio frequency protocol, satellite band, infrared channel, or any other protocol able to transmit data among client machines. The wired communication interfaces may include any wired line interfaces. Each traffic marker 12 may communicate with each other over the network 14. In addition, each traffic marker 12 may communicate with one or more client machines 18 over the network 14.

Figure 2:
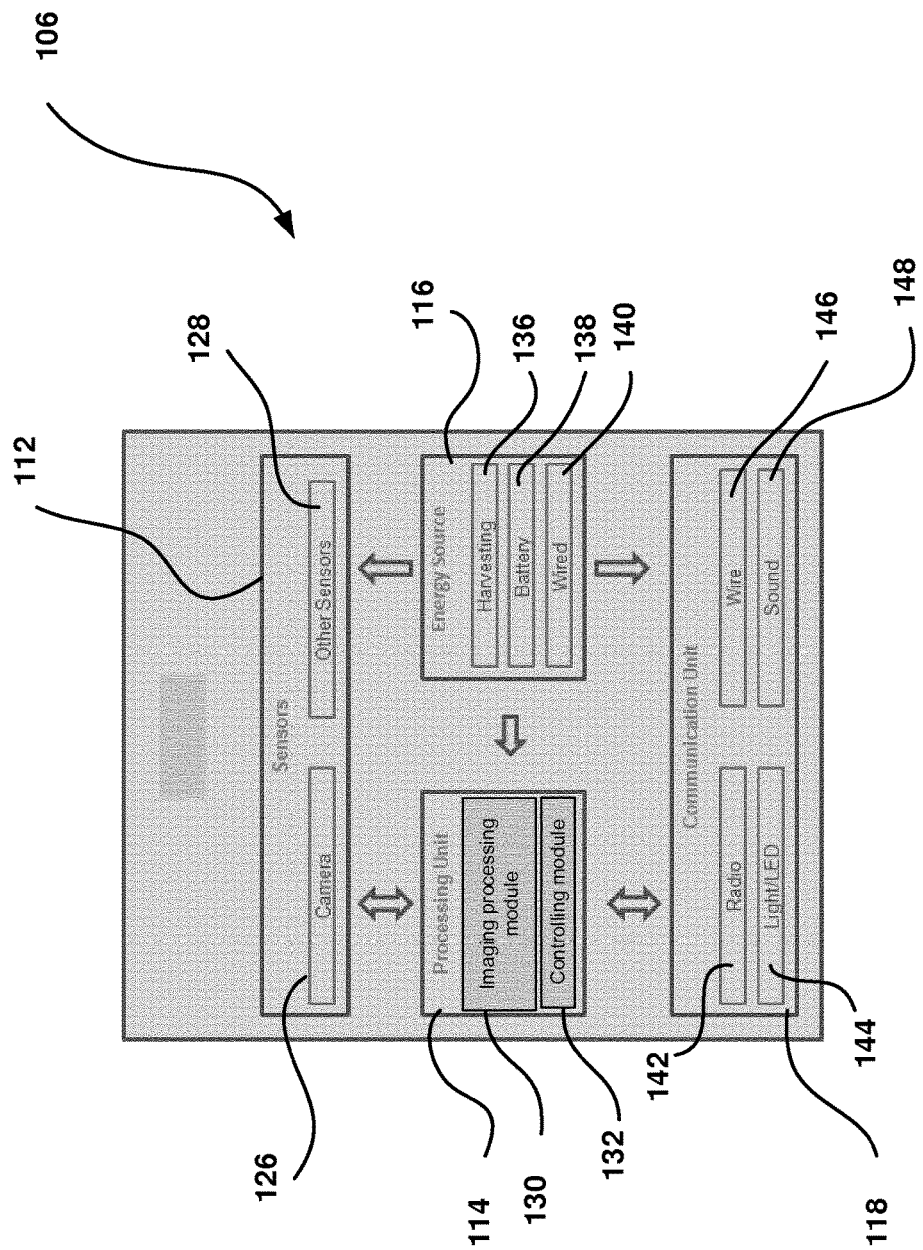
FIG. 2 is a block diagram illustrating a vision traffic marker according to a described embodiment of the disclosure.

FIG. 2 depicts a block diagram of a vision traffic marker 106 for a traffic environment network system 10 according to an exemplary embodiment of the disclosure. The vision traffic marker 106 includes a sensor assembly 112, a processing assembly 114, an energy source 116, and a communication interface assembly 118. The sensor assembly 112 includes an imaging sensor or a camera 126 and a sensor unit 128. In one embodiment, the sensor unit 128 may be a thermal sensor, a humidity sensor, an inertial sensor, a gas sensor, a motion sensor, a profile sensor, an environmental sensor, an optical sensor, oustic sensor, a combination thereof, or the like. Although one sensor 128 is illustrated, more than one sensor may be integrated into the vision traffic marker 106 to collect information such as environmental condition or traffic condition and then transmit the collected information in a formed of output signal to other internal components including the processing assembly 114 for processing. In one embodiment, the sensing sensor or the camera 126 and the sensor 128 may be integrated into a single package assembly. In another embodiment, the camera 126 and the sensor 128 may be two separate units and are electrically coupled to other internal components. In some embodiments, the sensors 126, 128 are fabricated as a single MEMS device. Detailed description of the camera or imaging sensor 126 will be described later.

The energy source 116 configured to power up the vision traffic marker 106 includes an energy storage device 138, an energy harvesting unit 136, and a wired connection unit 140 for connection to an external power source. Although various types of energy source units 136, 138 are incorporated into the vision traffic marker 106, other types of energy source unit such as an inductive charging unit, a qi-charging unit, a resistive charging unit, a solar unit, a secondary battery, a fuel cell unit, a supercapacitor, or the like may be either integrated into the vision device or communicatively coupled to the vision traffic marker 106 to energize or power the vision traffic marker 106. The wired connection unit 140 may be connected to an external source such as an AC source or a DC source.

The processing assembly 114 includes an imaging processing unit 130 and a controlling unit 132. The imaging processing unit 130 receives information captured by the sensor assembly 112 and processes the information. Once the information is processed, the imaging processing unit 130 transmits the processed information to the controlling unit 132. In turn, the controlling unit 132 generates a command for controlling the internal components, other vision traffic marker 106, or combination thereof. The controlling unit 132 may be of any type, including but not limited to a microprocessor, a microcontroller, a digital signal processor, or any combination thereof. Depending on the desired configuration, the processor may be includes one or more integrated circuits configured as a central processing unit, microcontroller, field programmable gate array (FPGA), application specific integrated circuit (ASIC), digital signal processor (DSP), or any other suitable digital logic device. The controlling unit 132 may also include a memory, such as a solid state or magnetic data storage device, that stores programmed instructions that are executed by the controlling unit 132 for operation of the vision traffic marker 106. In one embodiment, the controlling unit 132 may be operated autonomously without any server engagement based on the predefined rules and the data which is gather using the sensor assembly 112. The controlling unit 132 may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor. The controlling unit 132 includes hardware such as DSP which process the audio data or acoustic signal, and software components such as acoustic recognition software to identify the event.

The communication interface assembly 118 allows software and data to be transferred between the computer system, other external electronic devices, and other vision traffic markers in the form of signals which may be, for example, electronic, electromagnetic, optical, or other signals capable of being received by the communication interface. The communication interface may be for example a modem, a network interface, a communication port, a PCM-CIA slot and card, or the like. As illustrated in FIG. 2, the communication interface assembly 118 includes a radio unit 142, a light emitting unit 144, a wire/wireless interface 146, and an acoustic transducer 148. The radio unit 142 may be transceiver, an antenna, a receiver (TX), a transmitter (TX), or the like. The light emitting unit 144 may be for example a LED, an opto-coupler, or the like. The wire/wireless interface 146 may include cellular protocol, data packet protocol, radio frequency protocol, satellite band, infrared channel, or any other protocol able to transmit data among client machines. Also, the wire/wireless interface 146 includes any wired line link. The acoustic transducer 148 may be a microphone, a speaker, an audio input and output device, or a combination thereof. The communication assembly 118 may also include global navigation receiver to provide navigation and communication with external data networks, computing devices, client machines, other vision devices, and others. In one embodiment, the communication interface assembly 118 is communicatively coupled with other internal components thin the vision traffic marker 106 and with other devices client machines, vision traffic markers, a server, in-vehicle networks, traffic lights, street lights, or combination thereof over the network to exchange and share information of the event, activity, or status of the condition. The acoustic transducer 148 generates audio data or receive acoustic signal from an event and then transmits the signal to the controlling unit 132 for processing before the processed signal is transmitted to other external devices.

Figure 3A:
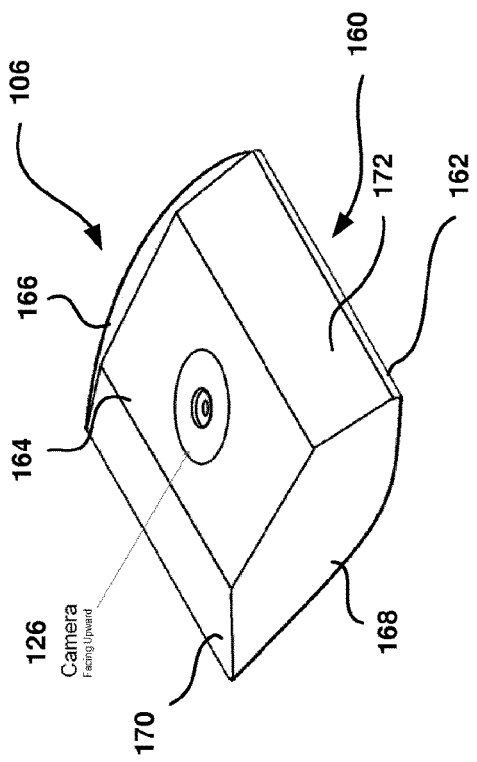
FIGS. 3A-3D are perspective views illustrating the vision traffic marker of FIG. 2 according to various embodiments of the disclosure.
Figure 3B:
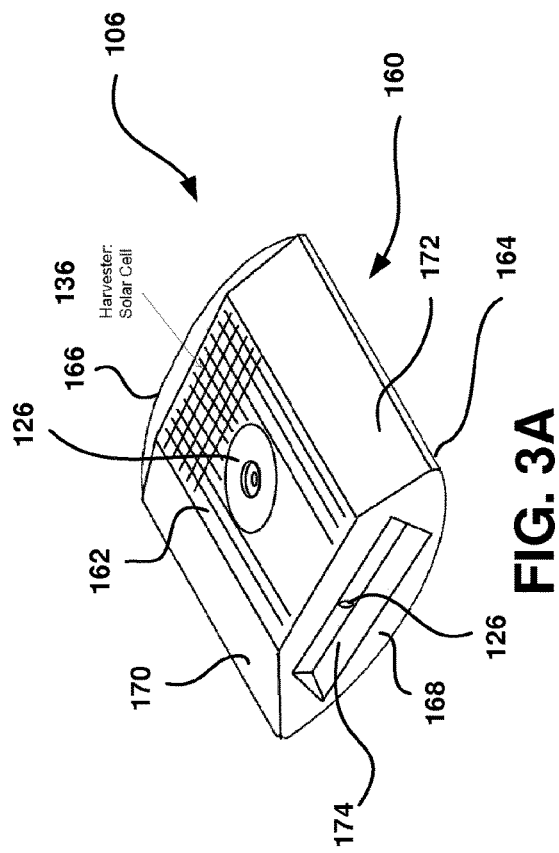

FIGS. 3A-3D illustrate various embodiments of the vision traffic marker 106 of the traffic environment network system. The vision traffic marker or traffic node 106 includes a housing 160 for encapsulating various internal components. The housing 160 includes a top portion 162, a bottom portion 164, a front portion 166, a rear portion 168, and lateral portions 170 and 172 extended from the top portion 162. In one embodiment, the lateral portions 170 and 172 may extend from other portions of the housing 160 such as the bottom portion 164 as shown in FIG. 3B. A receiving end 174, illustrated as an input and output port, is integrated to either the front portion 166 or the rear portion 168. In one embodiment, the receiving end 174 having an input/output port (I/O) for connection to a power source. In some embodiments, the I/O is a micro-USB that provides connection other devices. As depicted in FIG. 3A, an energy harvesting unit 136 is integrated into the vision traffic marker 106 for supplying energy to power the rest of the internal components. The energy harvesting unit 136 may be located on the top portion 162 of the housing 160, as illustrated. Alternatively, the energy harvesting unit 136 may be located on various portions of the housing 160. Although one harvesting unit 136 is provided in the vision traffic marker 106, more than one harvesting unit may be incorporated into the vision traffic marker, depending on the application. The harvesting unit 136 may be an inductive charging unit, a qi-charging unit, a resistive charging unit, a solar cell battery, a secondary battery, a solid state battery a fuel cell unit, or the like.

Figure 3C:
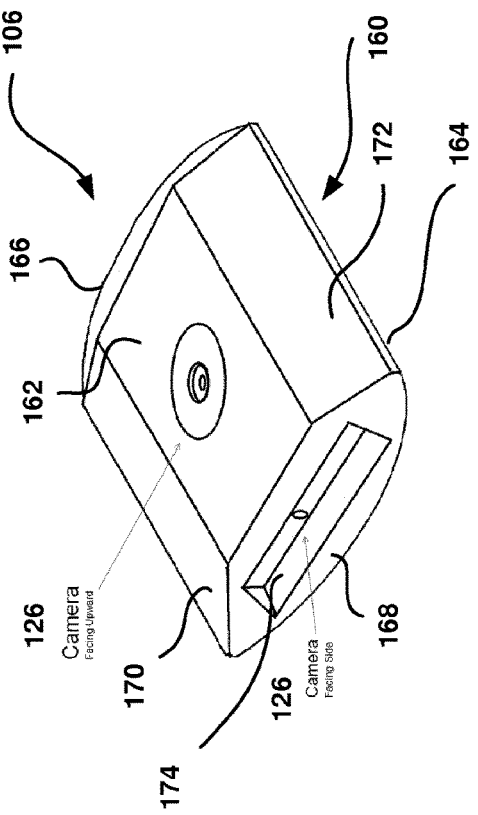
Figure 3D:
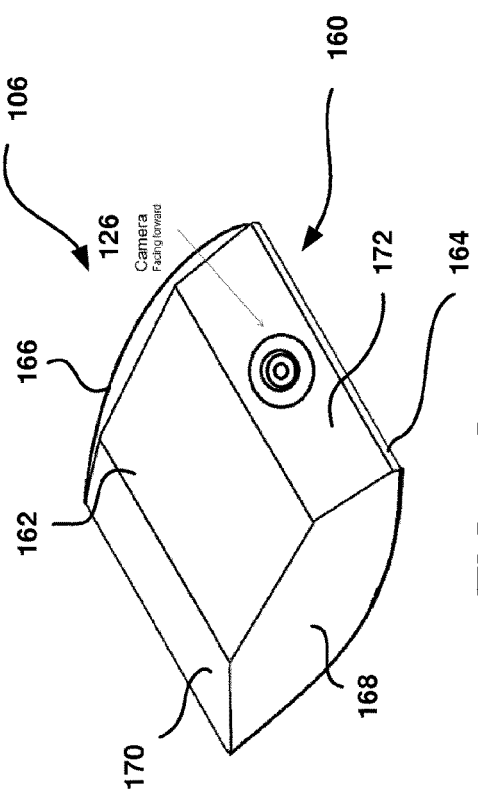

A camera or an imaging sensor 126 is configured to capture images of an event, an environment, a profile, or a condition of an object such as automotive, human, or combination thereof. As depicted in FIGS. 3A and 3D, two cameras or imaging sensors 126 are incorporated into the vision traffic marker 106, i.e. first camera is located on the top portion 162 of the housing 160 and second camera is located on the rear portion 168 of the housing 160. Alternatively, the camera 126 may be located on any portions of the housing 160 other than the described portions 162 and 168. In one embodiment, the camera 126 is located on the bottom portion 164 of the housing 160, as illustrated in FIG. 3B. In another embodiment, the camera 126 is located on one of the lateral portion 170, 172 of the housing 160, as illustrated in FIG. 3C. The second camera 126 as shown in FIGS. 3A and 3D is located on the rear portion 168 is in proximal to the receiving end 174.

Figure 4:
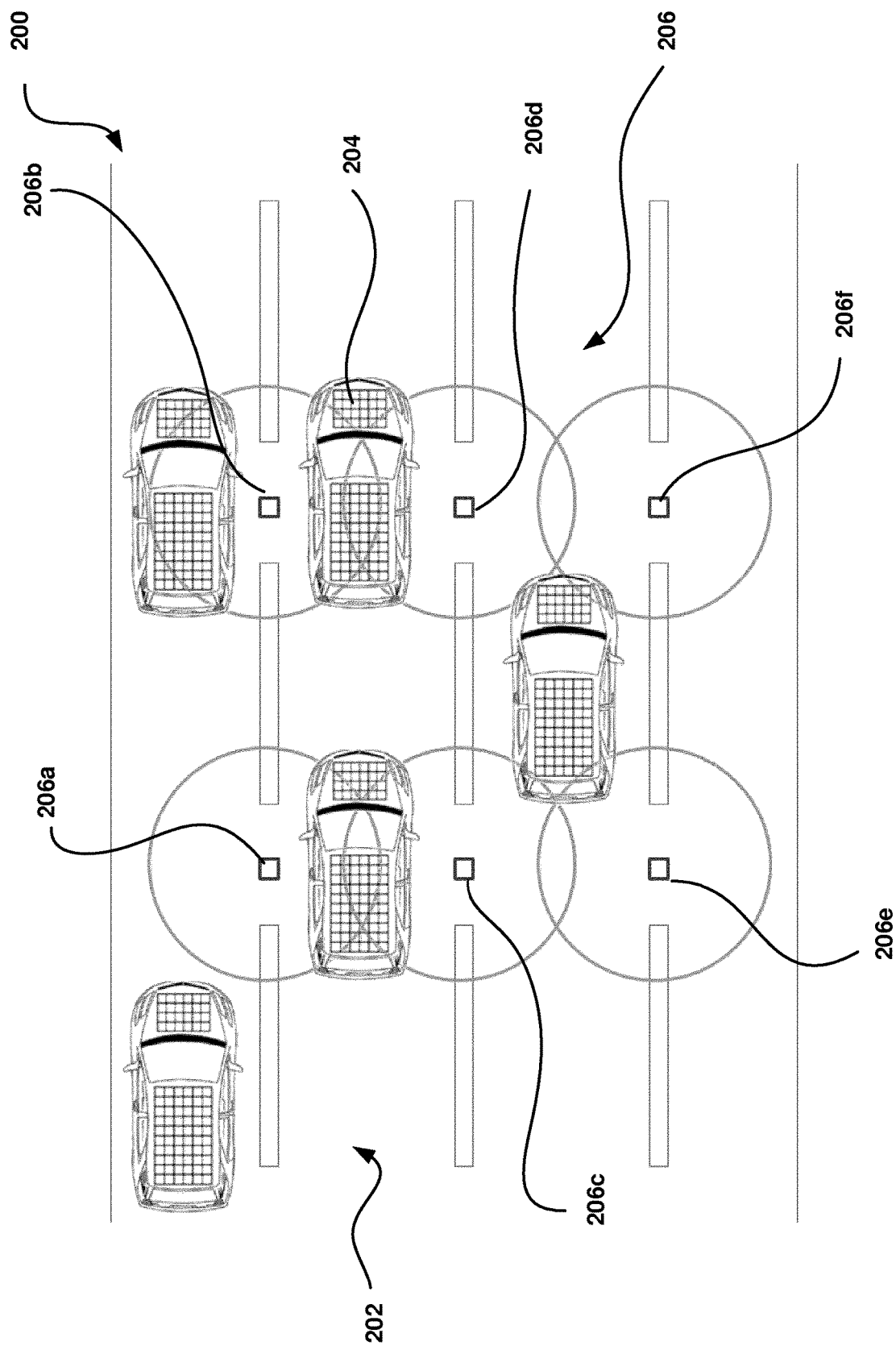
FIG. 4 is a schematic view illustrating an environment illustrating a traffic environment system comprising a network of distributed vision traffic markers according to one illustrated embodiment of the disclosure.

Now referring to FIG. 4, a traffic environment infrastructure 200 according to an exemplary embodiment of the disclosure is illustrated. The infrastructure 200 includes a road infrastructure 202, a plurality of vehicles 204, and a vision traffic node network system 206. The road infrastructure 202 may be a street, a parking lot, a bridge, a tunnel, a highway, an expressway, and the like. The vision traffic node network system 206 comprises a plurality of vision traffic markers 206a-206f, six vision devices are illustrated, configured to capture information such as an event, an environment, a profile, or a condition of an object such as vehicle, human, combination thereof, or the like, for example. The environment information may be time of day, day of week, weather, traffic condition, and the like. The vehicles 204 may be four-wheeled vehicles, motorcycles, trucks, RVs, and the like. The human information may be driver profile, passenger profile, pedestrian profile, or user profile. Depending on the applications, more or less than six vision traffic markers, also referred as traffic nodes may be incorporated as part of the vision traffic node network system 206 without altering the operation of the system or nodes. The nodes 106a-106f may be one of a traffic node, an ambient node, a repeater, a gateway, or a combination thereof. These nodes 206a-206f are arranged in network neighborhoods and configured for over the air communication with one another. In one embodiment, the nodes may be operated in at least one or more of the networks, such as a mesh network, machine-to-machine (M2M) network, car-to-infrastructure network, or combination. The vision traffic markers 206-206f are configured to communicate with at least one of the vision traffic markers or traffic nodes, a control system, the automotives, a server, a global navigation system, other non-vision devices, traffic lights, street lights, client machines, or combination thereof, via one more links, either wireless or wired communication. The client machine may be a smartphone, a tablet, a notebook computer, a laptop computer, a wearable device, or other electronic device. The communication includes data package protocol, cellular protocol, any radio frequency communication protocol, a combination thereof, or the like. In some embodiments, more than one vision traffic marker or traffic node may be interconnected in the same vehicle via different communication links Depending on the applications, various different vision traffic markers or traffic nodes may be deployed at any location to perform one or more tasks that operate either individually or in concert as multiple sub-group networks to provide captured information to one or more devices including control system, the automotives, a server, a global navigation system, other non-vision devices, traffic lights, street lights, client machines, or combination thereof. In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision traffic marker for diagnosis. The information of the vision traffic marker includes condition and status, such as, cleanliness of lens, battery life, geo location, link status, or the like.

In one embodiment, the vision traffic node network system 106 is organized as a central network system. In another embodiment, the vision traffic node network system 106 is organized on tiers, for example a high tier sub-network system, a medium tier sub-network system, and a low tier-sub-network system, in which each of these sub-network systems is assigned to perform different and tier-specific data collection and process tasks specific for that tier. The distribution of tier-based tasks allows testing of collected information and performed analyses within that tier sub-network system. The sub-network systems are also capable of peer-to-peer communication, sub-network system-to-sub-network system communication, sub-network system-to-node of different sub-network system, or the like. In one embodiment, two or more different sub-network systems may share one or more common vision traffic marker or traffic nodes. In another embodiment two or more different sub-network systems may be operated with different vision traffic marker or traffic nodes. The tier level structure may be based on location, geographic, road infrastructure, terrain, regional, or others.

Each vision traffic marker is powered by an energy source such as a secondary battery, a solar energy source, a resistive component, a fuel cell energy source, an inductive component, or the like. In one embodiment, the vision traffic node may be integrated into a marker component. The marker component may be a road traffic marker, a road/traffic sign, an advertisement board, a street sign, a signboard marker, a location marker, a mile marker, and the like. As illustrated in FIG. 4, each vision traffic marker 206a-206f include a fisheye lens camera or a wide lens camera for capturing a field of view (FOV) into an image. The vision traffic markers are integrated into a raised pavement marker. In some embodiment, different types of camera may be incorporated into the vision traffic marker 206a-206f to capture various types of view. Although one vision traffic node network system 206 is provided in the traffic environment infrastructure 200, more than one envisioned network system may be provided in the same traffic environment infrastructure 200 to communicate the traffic condition to another envision network system.

Figure 5:
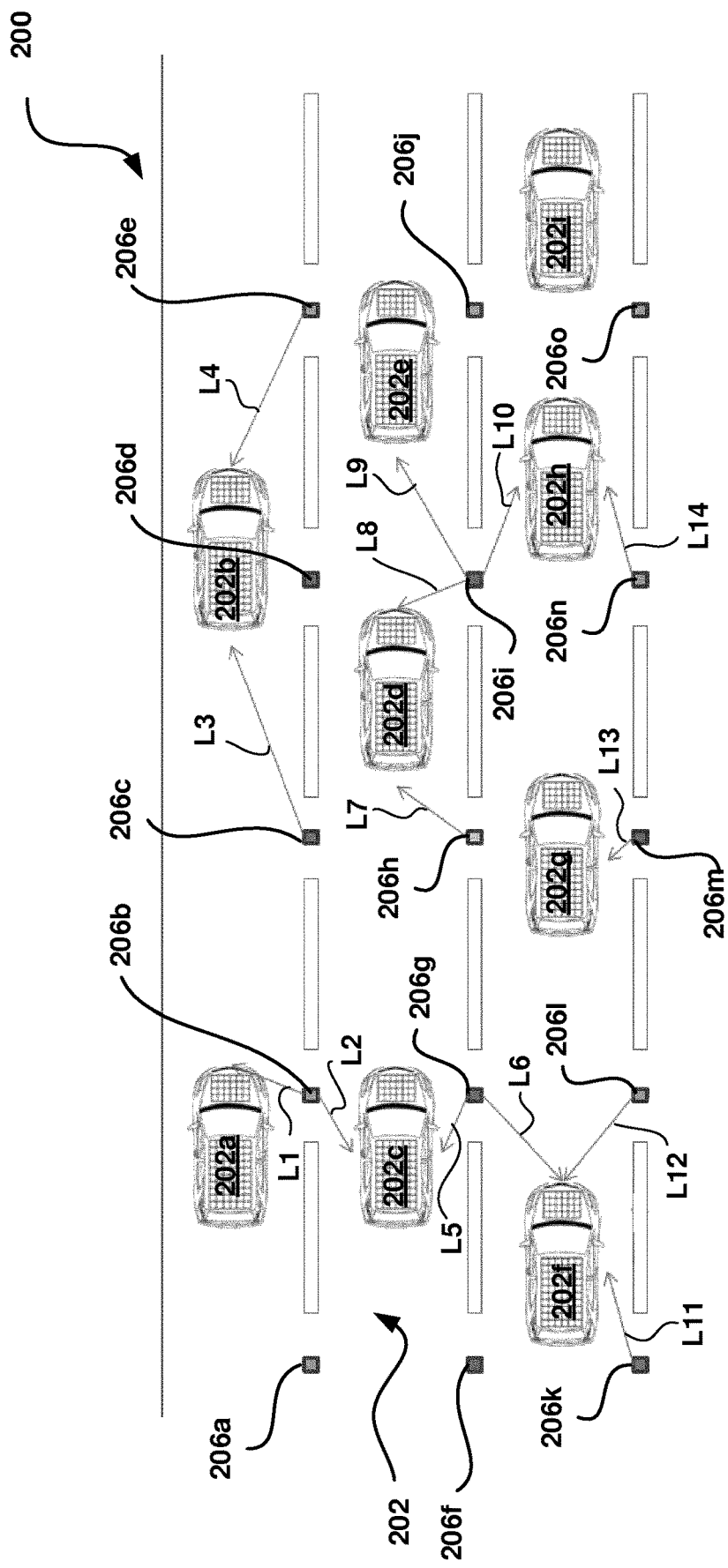
FIG. 5 is a schematic view illustrating an environment illustrating a traffic environment system comprising a network of distributed vision traffic markers according to another illustrated embodiment of the disclosure.
Figure 6:
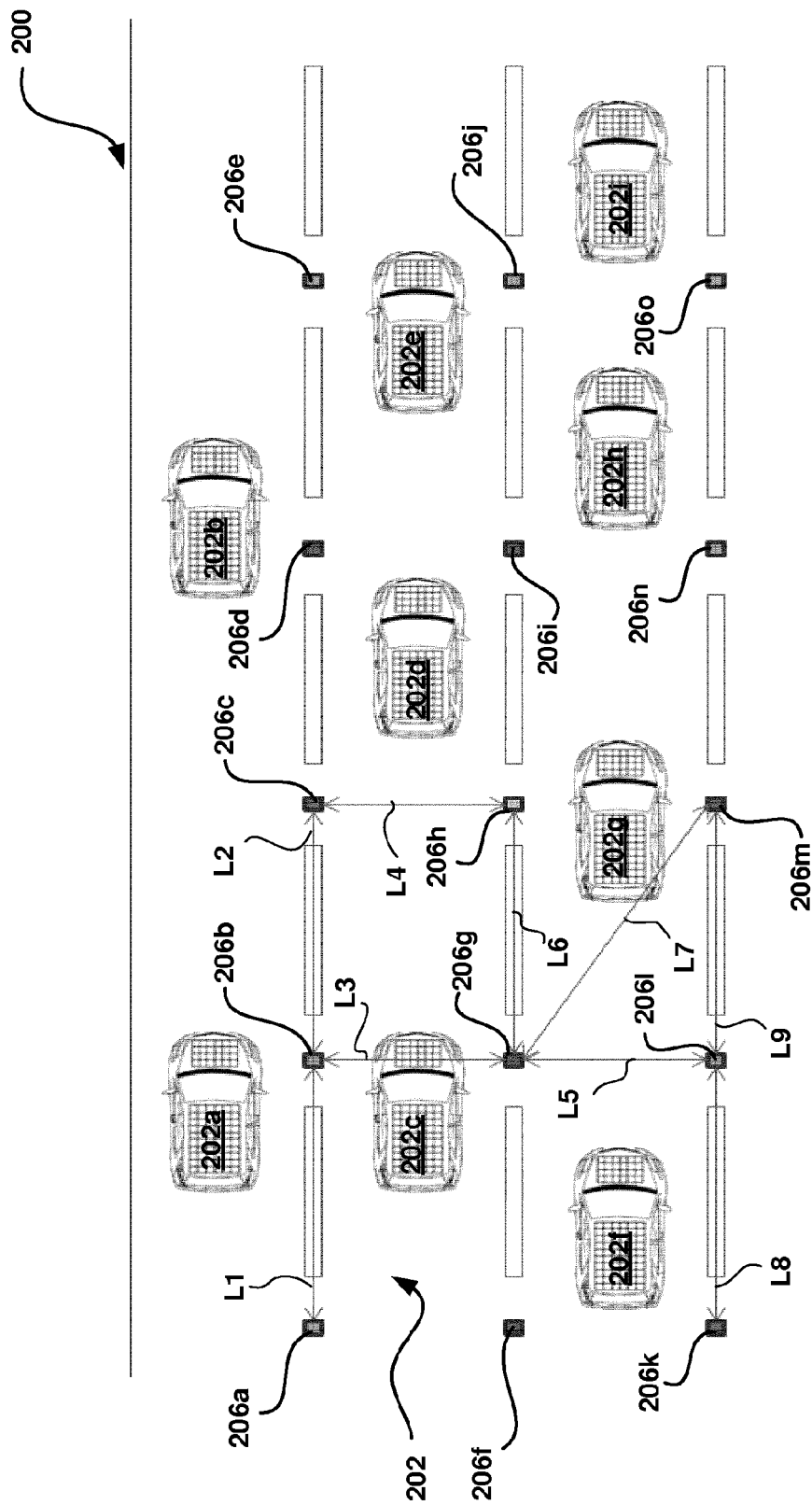
FIG. 6 is a schematic view illustrating an environment illustrating a traffic environment system comprising a network of distributed vision traffic markers according to another illustrated embodiment of the disclosure.

Now referring to FIG. 5, another traffic environment infrastructure 200 is illustrated. The traffic environment infrastructure 200 is similar to the traffic environment infrastructure 100 illustrated in FIG. 4, and like elements are referred to using like reference numerals. The vision traffic marker system 206 includes a plurality of vision traffic markers or traffic nodes 206a-206o configured to capture information such as an event, an environment, a profile, or a condition of an object such as automotive, human, combination thereof, or the like, for example. The nodes 206a-206o may be one of a traffic node, an ambient node, a repeater, a gateway, or a combination thereof. Each nodes 206a-206o may be integrated into a traffic marker, a road/traffic sign, a street sign, a signboard marker, a location marker, a mile marker, or the like. In another embodiment, more than one nodes 206a-206o may be integrated into a single marker or sign. The nodes 206a-206o are arranged in network neighborhoods and configured for over the air communication with one another. As illustrated in FIG. 5, each node 206a-206o operated either in a mesh network, machine-to-machine (M2M) network, car-to-infrastructure network, or combination is interconnected with one or more of a passing vehicle by links L1 . . . Ln. For example, node 206b is interconnected with vehicles 202a, 202c via links L1, L2. Nodes 206c and 206e, for another example, are interconnected with vehicle 202b via links L3, L4, respectively. In yet another example, node 206i is interconnected with vehicles 202d, 202e, and 202h via links L8, L9, and L10. In another example, vehicle 202f may wirelessly communicate with multiple nodes 206g, 206i, and 206k.

As previously explained in FIG. 2, the camera or imaging sensor 126 of sensor assembly 112 one of more than one images or videos representation of an event, an environment, a profile, or a condition of an object such as automotive, human, combination thereof, or the like. The sensor assembly 112 captures or detects one or more information such as day lights, temperatures, ambient, for example, in addition to image or video. One or more of the acoustic transducer 148 and the light emitting unit 144 detect acoustic signal and light signal, respectively. The captured image, video, acoustic signal, light signal, or combination thereof is then transmitted to the processing unit 114. The processing unit 114 includes software, such as image or video processing software, which processes the captured image or video, and acoustic processing software, to identify acoustic signal, either collectively or separately processed into metadata associated with that captured information. The communication interface assembly 118 then transmits the metadata to any traffic nodes 206b-206o, the server, vehicles, client machines, and other vision traffic marker network system. For example, a driver with a hazardous driving behavior travels on a highway at 100 mile per hours without a legal licensed plate is caught by at least one of the vision device 206a-206o, the captured information is transmitted to a processing unit 114 of one of the vision device 206a-206o for processing. The processed information associated with metadata stating that the reading represents travel speed, the unlicensed vehicle plate, location of that vehicle, and time of traveling. The processed information associated with metadata may also include the predictive next location of that vehicle and arrival time to the next location in an augmented version. The communication interface assembly 118 in turn transmits the processed information associated with metadata to another vehicle, such as a law enforcer, in a nearby location. When the law enforcer receives the information, the law enforcer can chase after that vehicle to stop the driver so that accident can be avoided. In one embodiment, the processing unit 114 receives the captured image, video, acoustic signal, light signal, or combination thereof and transmits the captured image, video, acoustic signal, light signal, or combination thereof as raw data without processing it to another nodes, servers, automotives, and travelers.

In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision device for diagnosis. The information of the vision device includes condition and status, such as, cleanliness of lens, battery life, geo location, link status, or the like. As previous described, the vision traffic markers are energized by an integrated energy components through chemical reaction, inductive charging, sunlight, and so far. The vision traffic markers may be energized by nearby vehicle.

FIG. 5 illustrates a traffic environment system 200 of another embodiment of the disclosure. The traffic envisioned system 206 includes a plurality of vision devices or nodes 206a-206o configured to capture information such as an event, an environment, a profile, or a condition of an object such as automotive, human, combination thereof, or the like, for example. The nodes 206a-206o may be one of a traffic node, an ambient node, a repeater, a gateway, or a combination thereof. Each vision devices 206a-206o may be integrated into a traffic marker, a road/traffic sign, a street sign, a signboard marker, a location marker, a mile marker, or the like. In another embodiment, more than one vision devices or nodes 206a-206o may be integrated into a marker or sign. The vision devices or nodes 206b, 206g, and 206i exchange the information either via wired connection or wireless connection. The nodes 206a-206o are arranged in network neighborhoods and configured for over the air communication with one another. As illustrated in FIG. 5, each of the nodes 206a-206o operated either in a mesh network, machine-to-machine (M2M) network, car-to-infrastructure network, or combination is interconnected with one or more of a node by links L1 . . . Ln. For example, node 206b exchanges and shares information with nodes 206a, 206c, and 206 via links L1, L2, L3, respectively. On the other hand, node 206g, for another example, is exchanging and sharing information with nodes 206h, 206i, and 206m via links L5, L6, L7, respectively.

The camera or sensing sensor 126 of sensor assembly 112 as shown in FIG. 2 captures one of more than one images or videos representation of an event, an environment, a profile, or a condition of an object such as automotive, human, combination thereof, or the like. The sensor assembly 112 captures or detects one or more information such as day lights, temperatures, ambient, for example, in addition to image or video. One or more of the acoustic transducer 148 and the light emitting unit 144 as shown in FIG. 2 may also detects acoustic signal and light signal. The captured image, video, acoustic signal, light signal, or combination thereof is transmitted to the processing unit 114. The processing unit 114 includes software, such as image or video processing software, which processes the captured image or video, and acoustic processing software, to identify acoustic signal, either collectively or separately processed into metadata. The communication assembly 118 then transmits the metadata to one of the vision devices 206b-206o, the server 124, automotives 202a-202i, travelers 122, and other envisioned system (not shown). In one embodiment, the processing unit 114 receives the captured image, video, acoustic signal, light signal, or combination thereof and transmits the captured image, video, acoustic signal, light signal, or combination thereof as raw data without processing it to another nodes, servers, automotives, and travelers.

In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision device for diagnosis. The information of the vision traffic marker includes condition and status, such as, cleanliness of lens, battery life, geo location, link status, or the like. Unlike from the vision traffic marker having a fisheye lens camera or a wide lens camera for capturing a field of view (FOV) facing upward to the sky, as illustrated in FIG. 4. The vision traffic nodes mounted into pavement markers in FIG. 5 include a fisheye lens camera or a wide lens camera facing sideway for capturing a field of view (FOV). In some embodiments, different types of camera may be incorporated into the vision traffic marker 206a-206f to capture various types of view. Although one vision traffic node network system 206 is provided in the traffic environment infrastructure 200, more than one envisioned network system may be provided in the same traffic environment infrastructure 200 to communicate the traffic condition to another vision traffic marker network system. For example, the traffic nodes 206c, 206d, and 206 capture various views of the road conditions on the most left lane and middle lane with cameras mounted on both sides of the traffic node. The captured view may contain information other than road conditions. Once the views are captured by the cameras, the cameras transmit the views to the processing unit for analyzing and processing. The processed views are then sent to any server, other vision traffic marker network system, the network, client machines for reporting the event and status of the condition. In some embodiment, captured views may be attached together during the processing stage before it is reported to any server, other vision traffic marker network system, the network, client machines. The reported information may assist the stakeholder to take measures in controlling other devices available in the road traffic infrastructure. For example, the stakeholder, e.g. traffic control tower, may control the street lights, traffic lights, traffic signs, or bridge gates to thin out the traffic condition in case of congested traffic is reported. The traffic nodes illustrated in FIG. 5 may include two camera on each side of the node. In some embodiment, the traffic nodes may include one camera mounted on any side of the nodes. In other embodiments, a plurality of cameras may be mounted on all sides of the traffic nodes.

Figure 7:
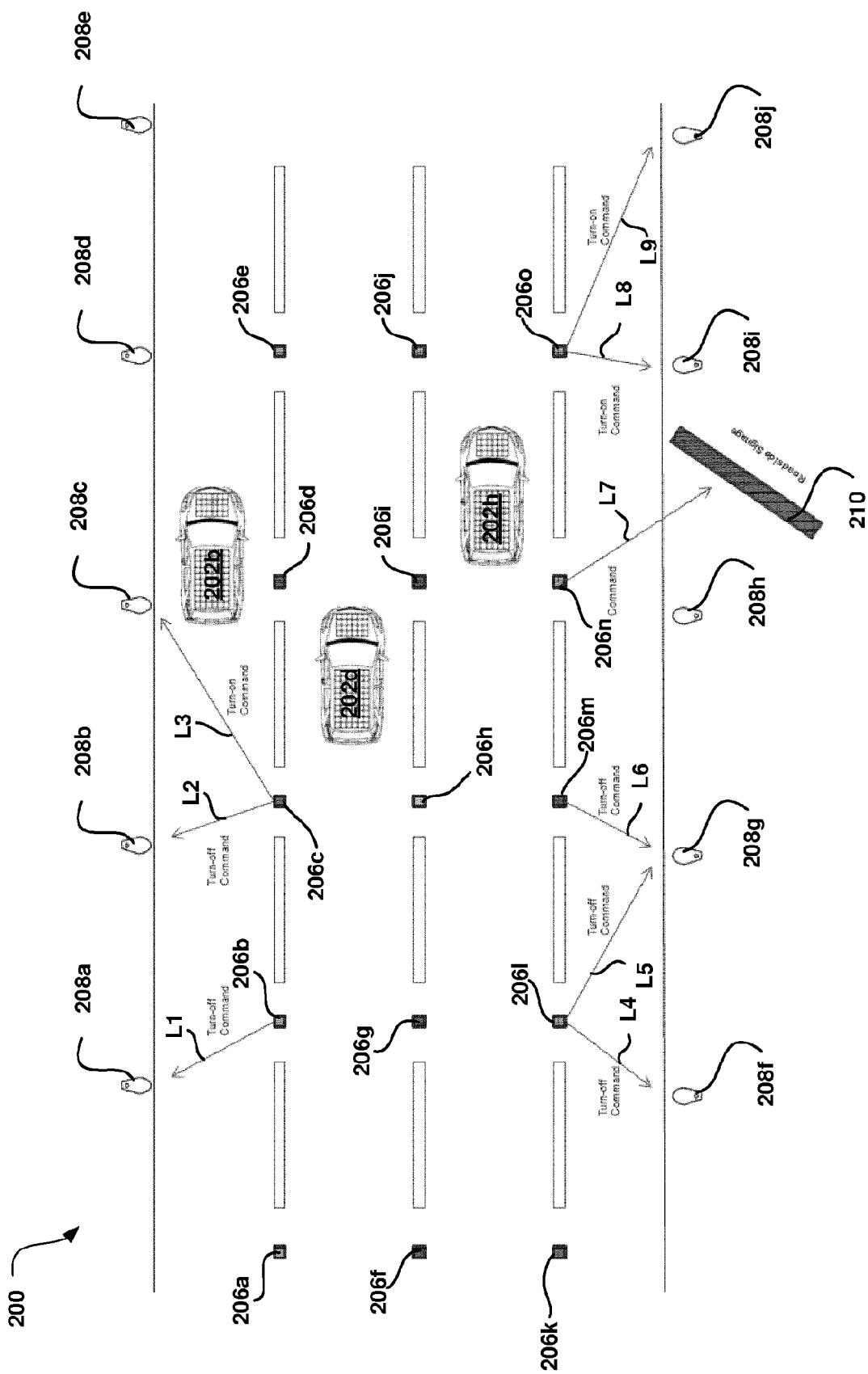
FIG. 7 is a schematic view illustrating an environment illustrating a traffic environment system comprising a network of distributed vision traffic markers according to another illustrated embodiment of the disclosure

FIG. 7 illustrates a traffic environment system 200 of another embodiment of the disclosure. The vision traffic marker network system 206 includes a plurality of vision traffic markers or traffic nodes 206a-206o configured to capture information such as an event, an environment, a profile, or a condition of an object such as automotive, human, combination thereof, or the like, for example. The nodes 206a-206o may be one of a traffic node, an ambient node, a repeater, a gateway, or a combination thereof. Each vision traffic marker 206a-206o may be integrated into a traffic marker, a road/traffic sign, a street sign, a signboard marker, a location marker, a mile marker, or the like. In another embodiment, more than one vision traffic markers or nodes 206a-206o may be integrated into a marker or sign. The vision traffic markers or nodes 206b, 206g, and 206i exchange the information either via wired connection or wireless connection. The nodes 206a-206o are arranged in network neighborhoods and configured for over the air communication with one another. One or more agents such as traffic signs or traffic lights 208a-208j with integrated nodes may wirelessly or wired communicate with one or more vision traffic markers or nodes 206a-206i. Optionally, a roadside signage 210 with integrated node may communicate with one or more vision traffic markers or nodes 206a-206i either via a wired communication or a wireless communication. In one embodiment, one or more of the agents 208a-208j may communicate with the signage 210 via at least one of the vision devices or nodes 206a-206i. In another embodiment, the agent 208a, such as traffic sign may communicate with another or more than one agent via one of the vision traffic marker or node 206a-206i.

As illustrated in FIG. 7, each of the nodes 206a-206o, agents with integrated nodes 208a-208j, and the signage with integrated node 210 operated either in a mesh network, machine-to-machine (M2M) network, car-to-infrastructure network, or combination are interconnected with one another by links L1 . . . Ln. For example, node 206b exchanges and shares information with traffic sign 208a via link L1. In another example, node 206c exchanges and shares information with both traffic signs 208b, 208c via links L2, L3, respectively. In yet another example, nodes 206i, 207m exchange and share different information with traffic sign 208g via links L5, L6, respectively. On the other hand, node 206n, for example, exchanges and shares information with signage via link L7. Although the nodes 206a-206o are capable to exchange and shares information with another node, agents, and signage as described above, the nodes 206a-206o are also capable of forwarding, routing, rerouting, or broadcasting to another node, agents, and signage without departing from the spirit and scope of disclosure. In another embodiment, the nodes 206a-206o placed at different locations in the traffic environment system are interconnected with each other to control one or more of the agents 208a-208j, 210 without or without an external central controller (not shown).

The camera or sensing sensor 126 of sensor assembly 112 as shown in FIG. 2 captures one of more than one images or videos representation of an event, an environment, a profile, or a condition of an object such as automotive, human, combination thereof, or the like. The sensor assembly 112 captures or detects one or more information such as day lights, temperatures, ambient, for example, in addition to image or video. One or more of the acoustic transducer 148 and the light emitting unit 144 as shown in FIG. 2 may also detects acoustic signal and light signal. The captured image, video, acoustic signal, light signal, or combination thereof is transmitted to the processing unit 114. The processing unit 114 includes software, such as image or video processing software, which processes the captured image or video, and acoustic processing software, to identify acoustic signal, either collectively or separately processed into metadata. The communication interface assembly 118 then transmits the metadata to one of the vision traffic markers 206b-206o, the server 124, automotives 202a-202i, client machines, and other vision traffic marker network system. In one embodiment, the processing unit 114 receives the captured image, video, acoustic signal, light signal, or combination thereof and transmits the captured image, video, acoustic signal, light signal, or combination thereof as raw data without processing it to another nodes, servers, automotives, and travelers. For example, a driver with a hazardous driving behavior travels on a highway at 100 mile per hours without a legal licensed plate is caught by at least one of the vision traffic markers 206a-206o, the captured information is transmitted to a processing unit 114 of one of the vision traffic markers 206a-206o for processing. The processed information associated with metadata stating that the reading represents travel speed, the unlicensed vehicle plate, location of that vehicle, and time of traveling. The processed information associated with metadata may also include the predictive next location of that vehicle and arrival time to the next location in an augmented version. The communication interface assembly 118 in turn transmits the processed information associated with metadata to at least one of the marker components such as traffic lights 208d, 208e in a nearby location. When the marker components 208d, 208e receive the information, the marker components 208d, 208e controlled by a controller turn the signal from green to red immediately to stop the vehicle and optionally protect pedestrian on the road.

In one embodiment, the captured information may be traffic conditions, ambient conditions, vehicle license plate number, speed of the vehicle, color of the vehicle, type of the vehicle, vehicle model, classification of passing cars, profile of the pedestrian, number of passengers in the vehicle, the profile of the driver (such as whether the driver has a safety helmet or seatbelt on), misbehavior of the driver and/or passenger(s), or the like. In another embodiment, the captured information may include average speed of cars during a certain time. In yet another embodiment, the captured information may be information of the vision device for diagnosis. The information of the vision device includes condition and status, such as, cleanliness of lens, battery life, geo location, link status, or the like.

Figure 8:
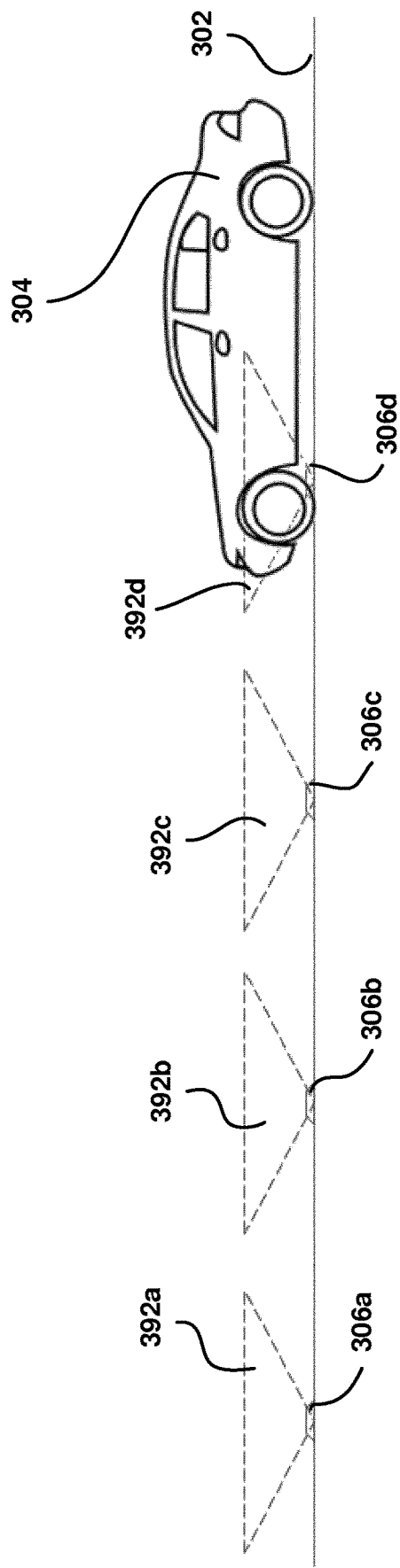
FIG. 8 is a perspective view illustrating a road infrastructure including a network of distributed vision traffic markers according to another illustrated embodiment of the disclosure.

FIG. 8 illustrates a road infrastructure 302 including a plurality of vision traffic markers or nodes 306a-306d of an exemplary embodiment of the disclosure. The vision traffic markers or nodes 306a-306d are placed at different location on a top surface of the road for capturing an event, for example. In one embodiment, the vision traffic markers or nodes 306a-306d may be integrated below the surface of the road. The vision traffic markers or nodes 306a-306d are interconnected together via wired connection or wireless connection. Each vision device or node 306a-306d as shown in FIG. 8 includes a camera or sensing sensor with a lens faces in one direction. In one embodiment, the lens of each node 306-306d may face either at an upward direction which is position at a 90 degree perpendicular to the plane of the surface, at an angle offset to the plane of the surface, or combination thereof. Each vision traffic marker or node 306a-306d are configured to pan tilt, and zoom to provide a view 392a-392d of information such as an event, an environment, a profile, or a condition of an object such as automotive, human, combination thereof, or the like, for example. The lens may be, for example, a fisheye lens or a wide lens. When a vehicle 304 on the road drives or passes through the node 306d, the information of the vehicle such as speed, bottom profile of the vehicle, are captured or detected. The neighboring nodes 306a-106c, may predict the travel time of the vehicle reaches the destination, region, or the next nodes based on the speed of the vehicle in a forward direction.

Figure 9:
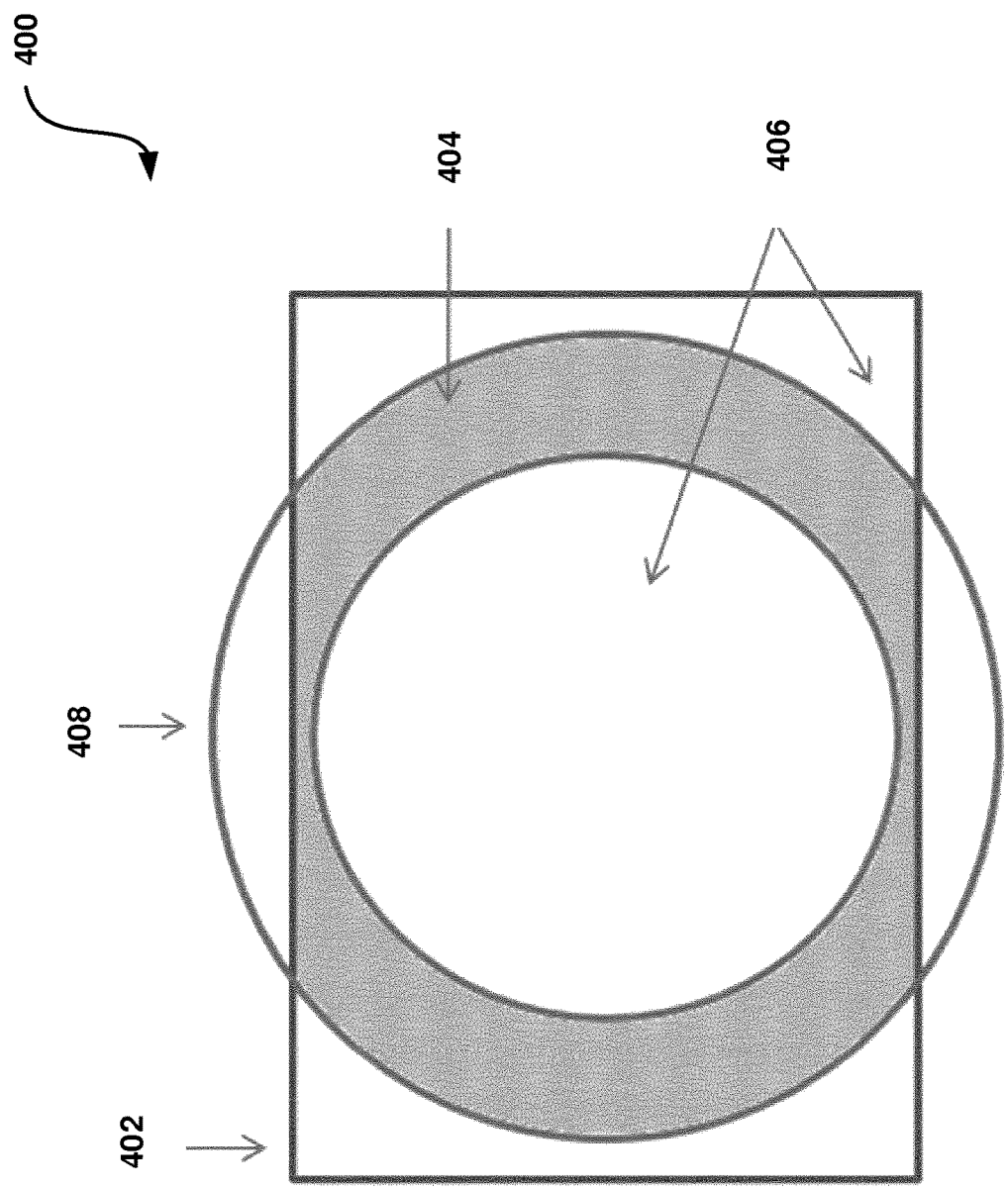
FIG. 9 is a top view illustrating an imaging array captured by an image sensor of a vision device according to an exemplary embodiment of the disclosure.

FIG. 9 depicts top view of an image sensor 400 of a vision traffic marker according to an exemplary embodiment of the disclosure. The image sensor 400 comprises a sensing die 402 and an electronic circuit (not shown) coupled to the sensing die 402. The sensing die 402 is made of silicon material. In another embodiment, the sensing die 402 may be made from other material without departing from the spirit and scope of the disclosure. The electronic circuit may be located either below the sensing die directly or indirectly, next to the sensing die, or proximal to the sensing die. An image is formed at location "formed image" 408 of the image sensor. Information to the traffic and environmental condition appears at location "active pixel area" 404 and non-traffic and environmental related information appears at location "deactivated pixel area" 406. Since the "active pixel area" 404 is smaller than the overall combined area of "deactivated pixel area" 406, the time for processing data relevant the traffic and environmental condition is significantly faster. Also, power consumption to processing the traffic and environmental related data is significantly reduced.

Figure 10:
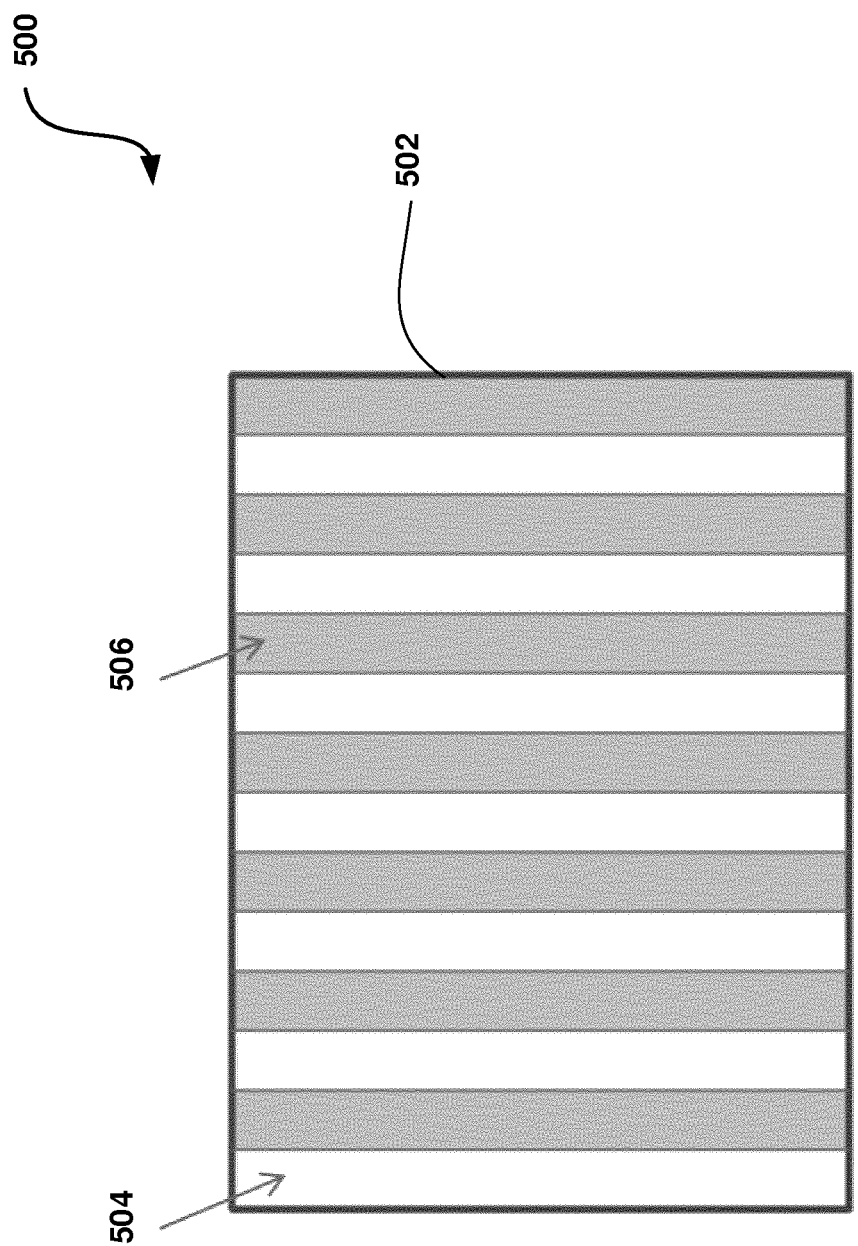
FIG. 10 is a top view illustrating an imaging array according to another embodiment of the disclosure.

FIG. 10 illustrates a top view of an image sensor 500 of a vision traffic marker according to another embodiment of the disclosure. Unlike from the image sensor 400 as shown in FIG. 9, the image sensor 500 comprises a plurality of vertical pixel having active areas 504 and deactivate areas 506. Circuitry such as an electronic circuit, readout circuit, harvesting circuit, and the like may be located on the deactivate areas. In one embodiment, the circuit may be located directly or indirectly below the deactivate areas 506. In another embodiment, the circuit may be located next to the deactivate areas 506. In yet another embodiment, the circuit may be located in proximal to the deactivate areas 506. Since the "active pixel area" 504 is reduced compare to the overall area of the chip 502, the time for processing data relevant the traffic and environmental condition is significantly faster. Also, power consumption to processing the traffic and environmental related data is significantly reduced.

Figure 11:
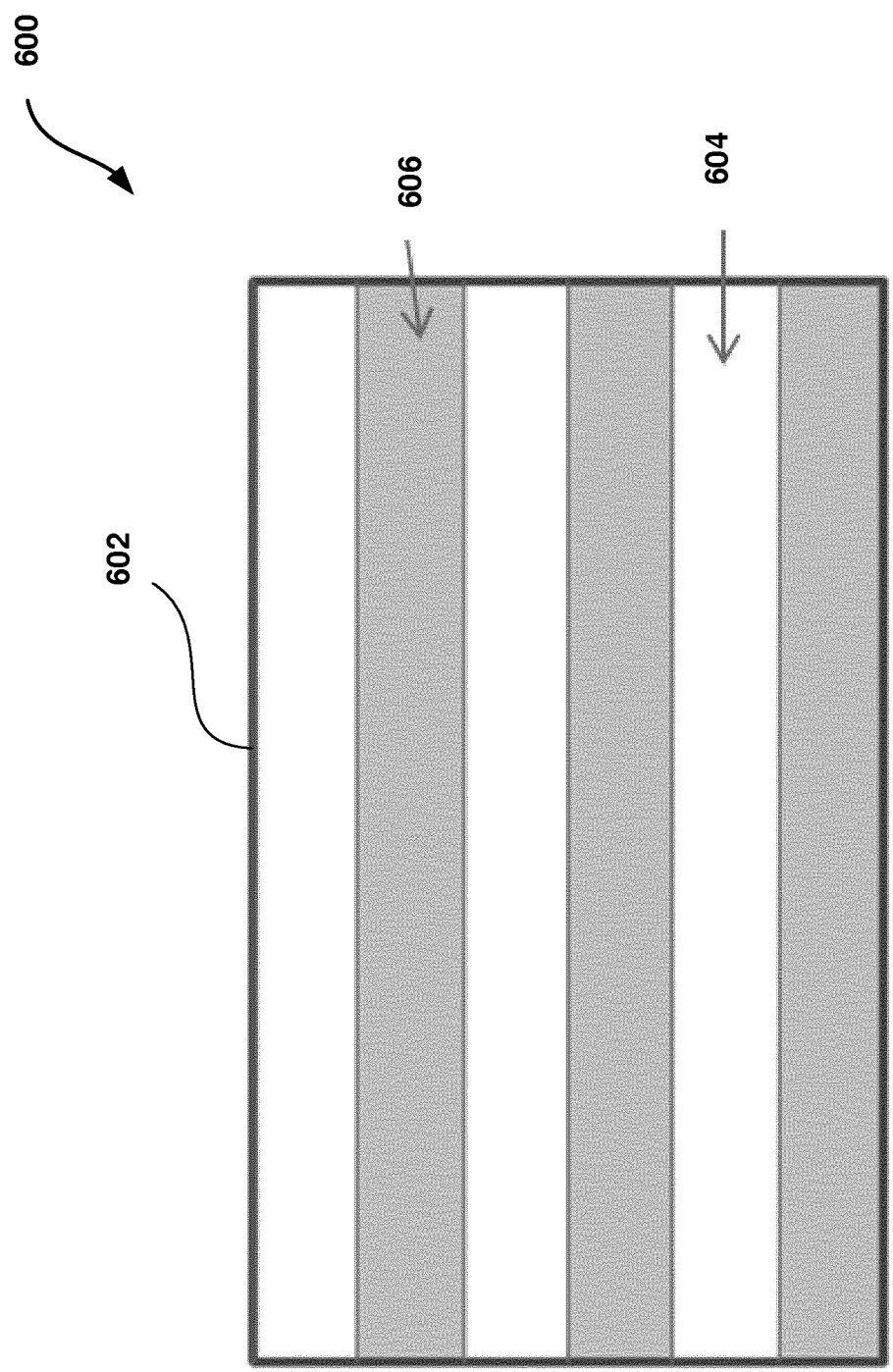
FIG. 11 is a top view illustrating an imaging array according to yet another embodiment of the disclosure.

FIG. 11 illustrates a top view of an image sensor 600 of a vision traffic marker according to another embodiment of the disclosure. The image sensor 600 is similar to the image sensor 500 of FIG. 10, except the image sensor 600 comprises a plurality of horizontal pixel having active areas 604 and deactivate areas 606. Circuitry such as an electronic circuit, readout circuit, harvesting circuit, and the like may be located on the deactivate areas. In one embodiment, the circuit may be located directly or indirectly below the deactivate areas 606. In another embodiment, the circuit may be located next to the deactivate areas 606. In yet another embodiment, the circuit may be located in proximal to the deactivate areas 606. Other than the above described arrangements or forms of image pixel arrays, the pixel array may be in the form of for example serpentine, square, oval, or other geometry. Since the "active pixel area" 604 is reduced compare to the overall area of the chip 602, the time for processing data relevant the traffic and environmental condition is significantly faster. Also, power consumption to processing the traffic and environmental related data is significantly reduced.

Figure 12:
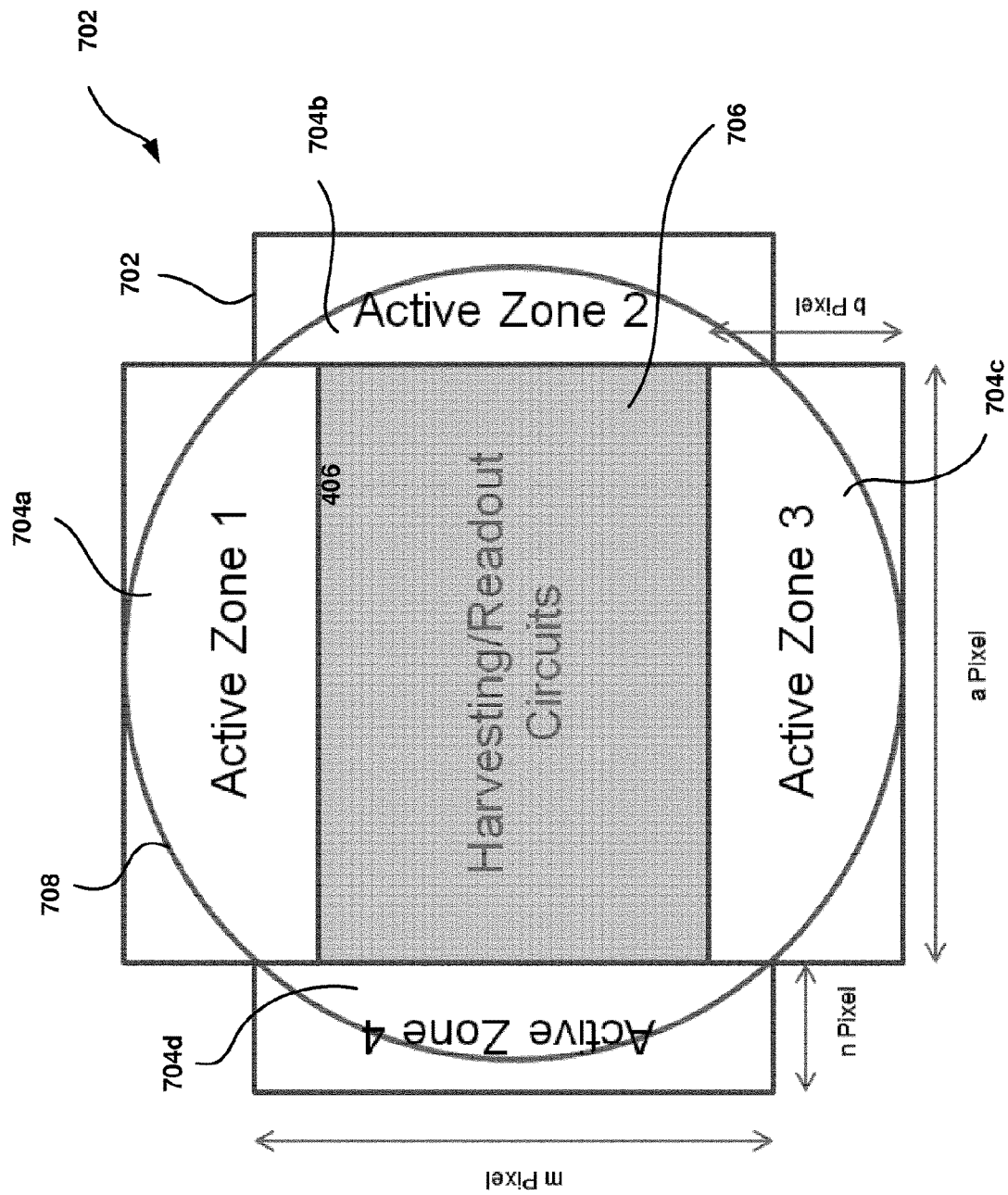
FIG. 12 is a top view illustrating an imaging array according to yet another embodiment of the disclosure.

FIG. 12 illustrates a top view of an image sensor 700 of a vision traffic marker according to another embodiment of the disclosure. The image sensor 700 is similar to the image sensor 600 of FIG. 11, except the image sensor 700 comprises multiple separate arrays 704a-704d. The image sensor 700 comprises a sensing die 702 and an electronic circuit (not shown) coupled to the sensing die 302. The sensing die 702 made of for example, a silicon material. In another embodiment, the sensing die 702 may be made from other material without departing from the spirit and scope of the disclosure. The electronic circuit may be located either below the sensing die directly or indirectly, next to the sensing die, or proximal to the sensing die. An image is formed at location 708 of the image sensor, defines as "formed image". Information of an event, an environment, a profile, or a condition of an object such as automotive, human, combination thereof, and the like appears at various locations 704a-704d, define as "active zone". Location 706 defines as "deactivated pixel area" in which circuitry such as an electronic circuit, an energy harvesting circuit, readout circuit, and the like is located. Active zones 704b, 704d include m pixel and n pixel whereas active zones 704a, 704c include a pixel and b pixel.

Figure 13:
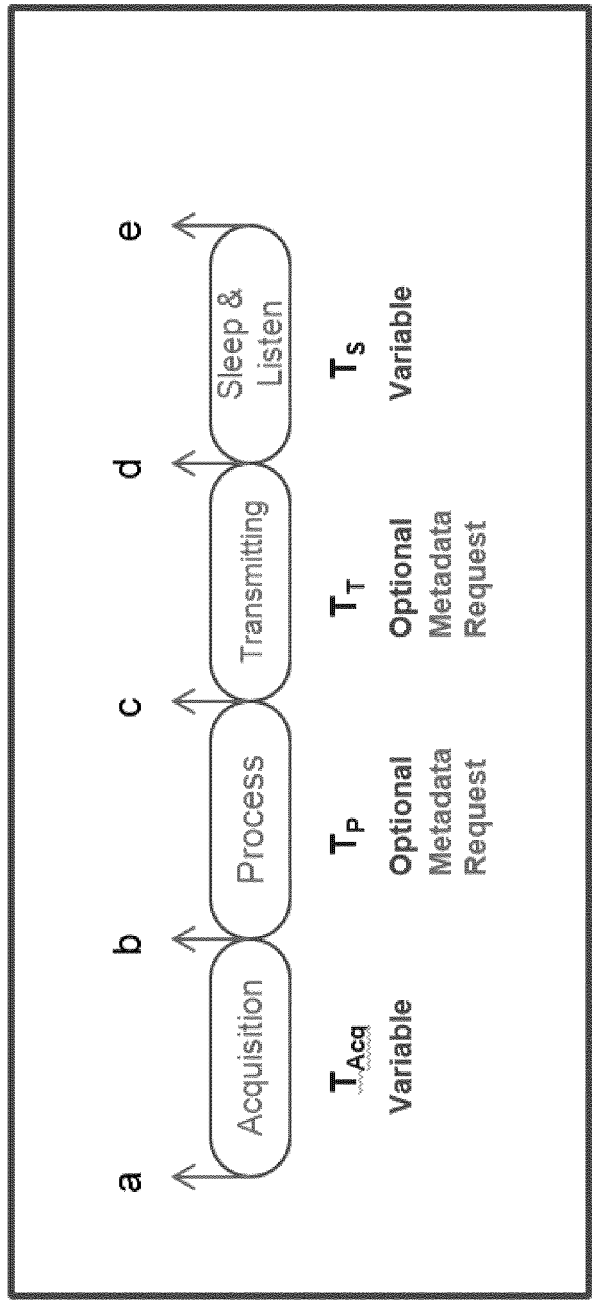
FIG. 13 is a perspective view illustrating a node operation cycle according to an embodiment of the disclosure.

FIG. 13 illustrates a node operation cycle according to an exemplary embodiment of the disclosure. At an acquisition phase, raw data is collected or acquired by at least one of the nodes 106 for $T_{acq}$ seconds through one or more sensors 126, 128. The data may be in the form of image, video, acoustic, thermal, light, and the like which represent at least one of an event, an environment, a profile, or a condition of an object such as automotive, human, combination thereof, and the like. $T_{acq}$ is a variable and changes based on the collected data between a range of about zero to maximum times required to capture the data. At a processing phase, the data is then transmitted to the processing unit 114 that executes sequences of computer-executable instructions using software stored in a machine-readable medium, such as image processing software, video processing software, acoustic processing software, and the like into metadata associated with that captured or collected data for $T_p$, defines as a processing duration. The instructions may be based on one or more requests or commands issued by another node, sub-network system, a control system, and the like. The computer-executable instructions include one or more of the processing, analyzing, comparing, summing, storing, executing, compiling, translating, transforming, distributing, interpreting, forming argument version of information associated with the captured data, and the like. At a transmitting phase, the metadata is then sent or forwarded to at least one of the vision devices or nodes, a sub-network system, a control system, the automotives, a server, a global navigation system, a marker component, other non-vision devices, traffic lights, street lights, electronic devices, and the like via the communication assembly 118 for $T_t$, defines as transmitting duration. $T_t$ can adapt based on Metadata and request. The node enters into sleep and listen mode after the transmitting phase is completed for several benefits to including preserve power or energy consumption, reduce data bandwidth, operating costs, and others. The node continues to stay in the sleep and listen mode to decrease and preserve power energy consumption until a next command from another node or the central unit is transmitted to the node to wake up the node from the sleep and listen mode. Once the node is wake up, it returns to the acquisition phase of the node operation cycle. In one embodiment, the node may be woke up by any external interruption such as a message from the automotives, a server, a global navigation system, a marker component, other non-vision devices, traffic lights, street lights, electronic devices, and the like. In another embodiment, the node may be work up by an internal interruption such as a message from the node itself for diagnosis.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A mesh network comprising:
  a plurality of intelligent distributed vision traffic markers, each of the intelligent distributed traffic marker including:
    a sensor assembly including a camera and a sensing element, the camera or the sensing element configured to obtain information of at least one of an event, a condition, a vehicle profile, and a human profile; and
    a processor configured to execute program instructions stored in a memory in order to:
      transmit the information to another vision traffic marker of the plurality of intelligent distributed vision traffic markers operated in the mesh network; and
      control the another vision traffic marker of the plurality of intelligent distributed vision traffic markers based on the information,
  wherein the information includes existing and predictive information of at least one of next event or next condition,
  wherein the camera includes an image sensor having a sensing die and an electronic circuit, the sensing die having an active pixel area and a deactivated pixel area, the electronic circuit being located in a portion of the deactivated pixel area and the deactivated pixel area being bigger than the active pixel area, and
  wherein the information including traffic and environmental conditions appear on the active pixel area and the information including non-traffic and non-environmental conditions appear on the deactivated pixel area.

2. The mesh network of claim 1 wherein the plurality of the vision traffic marker are integrated into at least one of road/traffic signs, advertisement boards, street signs, signboard markers, location markers, mile markers, and automotive vehicles.

3. The mesh network of claim 1 wherein the information is redirected, forwarded, rerouted, shared, or broadcasted to one or more vision traffic markers of the plurality of the vision traffic marker operated in the mesh network.

4. The mesh network of claim 1, wherein the sensing element is selected from a group consisting of a thermal sensor, a humidity sensor, an inertial sensor, a gas sensor, a motion sensor, a profile sensor, an environmental sensor, an optical sensor, or an acoustic sensor.

5. An intelligent distributed vision traffic marker assembly in a mesh network, the assembly comprising:
- a first vision traffic marker configured to obtain information associated with an event or a condition; and
- a processor configured to execute program instructions in order to:
  - transmit the information to a second vision traffic marker included in another intelligent distributed vision traffic marker assembly and configured to obtain information associated with the event or the condition operated in the mesh network; and
  - control the first and the second vision traffic marker based on the information,
- wherein the information further including existing and predictive information of at least one of next event or next condition,
- wherein the camera includes an image sensor having a sensing die and an electronic circuit, the sensing die having an active pixel area and a deactivated pixel area, the electronic circuit being is located in a portion of the deactivated pixel area and the deactivated pixel area being bigger than the active pixel area, and
- wherein the information including traffic and environmental conditions appear on the active pixel area and the information including non-traffic and non-environmental conditions appear on the deactivated pixel area.

6. The intelligent distributed vision traffic marker assembly of claim 5 wherein the processor is integrated into an external device.

7. The intelligent distributed vision traffic marker assembly of claim 5 wherein the processor is integrated into the first vision traffic marker.

8. The intelligent distributed vision traffic marker assembly of claim 5 wherein the information is redirected, forwarded, rerouted, shared, or broadcasted to one or more of vision traffic markers operated in the mesh network different from first or second vision traffic marker.

* * * * *

UNITED STATES PATENT AND TRADEMARK OFFICE
CERTIFICATE OF CORRECTION

PATENT NO. : 10,607,482 B2
APPLICATION NO. : 16/062554
DATED : March 31, 2020
INVENTOR(S) : Pouya Farajpour et al.

It is certified that error appears in the above-identified patent and that said Letters Patent is hereby corrected as shown below:

In the Claims

In Claim 5, at Column 18, Line 1, delete the word "is" between the words "being" and "located".

Signed and Sealed this
Eighteenth Day of August, 2020

Andrei Iancu
*Director of the United States Patent and Trademark Office*